Dec. 6, 1966 J. W. BROUILLETTE, JR., ET AL 3,290,623

APPARATUS FOR THE GENERATION OF PHONONS BY PIEZOELECTRIC EFFECTS

Filed April 17, 1964 2 Sheets-Sheet 1

INVENTORS:
JOSEPH W. BROUILLETTE, JR.
HSIUNG HSU,
STEPHEN WANUGA,

BY Marvin D. Goldenberg
THEIR ATTORNEY.

INVENTORS:
JOSEPH W. BROUILLETTE, JR.
HSIUNG HSU,
STEPHEN WANUGA,
BY Marvin L. Goldenberg
THEIR ATTORNEY.

United States Patent Office 3,290,623

Patented Dec. 6, 1966

3,290,623

APPARATUS FOR THE GENERATION OF PHONONS BY PIEZOELECTRIC EFFECTS

Joseph W. Brouillette, Jr., Jamesville, N.Y., Hsiung Hsu, Columbus, Ohio, and Stephen Wanuga, Liverpool, N.Y., assignors to General Electric Company, a corporation of New York Filed Apr. 17, 1964, Ser. No. 360,718
14 Claims. (Cl. 333—30)

The present invention relates to apparatus in which phonon energy is generated by piezoelectric effects. More particularly the invention concerns novel and improved apparatus of this type designed primarily for operation extending from the very high frequency range through the microwave range which provides efficient excitation of phonon energy within a piezoelectric body as well as a selective coupling to various phonon energy modes capable of excitation and propagation. The invention further relates to novel and improved narrow-band and wide-band high frequency structures which provide the above recited phonon energy excitation. In the context used, high frequency structures refer to coaxial lines, waveguides, cavity structures, etc., which are characterized by distributed capacitances and inductances.)

There has been a considerable amount of work performed in recent years with respect to the employment of high frequency cavity structures for providing excitation of phonon or acoustical energy in piezoelectric bodies in response to applied RF electric fields. Since the wavelength and velocity of propagation properties of acoustical energy are many orders of magnitude less than corresponding parameters of electromagnetic energy of the same frequency, there are many recognized advantages to be derived from the generation of acoustical energy which apply over a wide range of frequencies. Improved delay line and storage devices may be built since their dimensions can be reduced by orders of magnitude over that required for conventional electromagnetic energy devices. Also, phonon excitation and propagation offers improved parametric amplification possibilities because of the increased number of interactions possible within a given propagating distance.

However, although recognized advantages are obtainable with respect to the propagation of phonon energy, a major difficulty remains in providing efficient excitation of said energy. At the present time, for frequencies of 1K mc. and above, insertion losses on the order of 80 to 100 db are typical in coupling from electromagnetic energy to acoustical energy and back again to electromagnetic energy. In addition, when considering piezoelectric bodies capable of propagating more than one shear mode of acoustical energy, it is not possible, employing presently developed cavity structures and techniques, to select a particular shear mode for excitation. Such a selection is highly desirable where interactions between two or more modes are sought, as in parametric interactions of phonon waves. It is also desirable since the shear modes have different velocities of propagation and different coupling coefficients. In the prior art, only an indiscriminate coupling to shear and longitudinal modes is known to have been accomplished.

The instant invention provides a means for selectively coupling to the shear modes that are capable of being excited within a piezoelectric body, as well as separately coupling to the longitudinal mode. Also, with slight adjustment simultaneous coupling to all modes may be provided. In addition, the invention provides considerable improvement in efficiencies for coupling between electromagnetic energy and acoustical energy at the higher frequencies when utilizing piezoelectric effects.

It is accordingly an object of the present invention to provide a novel and improved high frequency structure which effects coupling between electromagnetic energy and acoustical energy utilizing piezoelectric effects, at a higher degree of efficiency than heretofore obtained in the prior art.

It is a further object of the present invention to provide a novel and improved high frequency structure for effecting efficient coupling between electromagnetic energy and acoustical energy wherein a directional electric field is provided for selectively coupling to either of two shear modes capable of excitation and propagation within a piezoelectric body, as well as separately coupling to the longitudinal mode.

It is a further object of the invention to provide a novel and improved high frequency structure for effecting coupling between electromagnetic and acoustical energy wherein considerable flexibility is had in selecting the mode or modes of acoustical energy to be coupled.

It is another object of the invention to provide a novel and improved re-entrant cavity structure in which the above set forth functions are accomplished.

It is still another object of the invention to provide a novel transmission line structure in which the above set forth functions are accomplished.

It is a further, more specific, object of the invention to provide a novel and improved re-entrant cavity structure for efficiently coupling to phonon energy within a piezoelectric body inserted into the cavity as well as selectively coupling to either of two shear modes capable of excitation and propagation within said piezoelectric body wherein the center post of said cavity structure is critically shaped so as to derive a directional electric field within said cavity structure for providing the indicated coupling mechanism.

It is still another, more specific, object of the invention to provide a novel transmission line structure for efficiently coupling to phonon energy within a piezoelectric body inserted into said structure as well as selectively coupling to either of two shear modes capable of excitation and propagation within said piezoelectric body wherein the center conductor of said transmission line is critically shaped so as to derive a directional electric field within said transmission line structure for providing the indicated coupling mechanism.

These and other objects are accomplished in one embodiment of the invention which includes a high frequency re-entrant cavity structure wherein a piezoelectric body in which acoustical energy is to be excited is inserted into the end wall of the cavity opposite the free end of the cavity center post. The end region of the center post is shaped so as to increase the density of the electric field in the vicinity of this end region for coupling to the piezoelectric body and, in addition, to provide the electric field with a substantially directional characteristic. By rotatably positioning the body with respect to the center post, predominantly either one of the two shear modes of acoustical energy within the piezoelectric body can be selectively excited.

In a second embodiment of the invention there is provided an open-end coaxial transmission line structure having a piezoelectric body inserted therein opposite the free end of the center conductor. As above described, the end region of the center conductor is shaped so as to increase the density of the electric field in the vicinity of the end region for coupling to the piezoelectric body, and for providing a substantially directional characteristic to the coupled electric field for selectively exciting the shear modes.

In accordance with one specific aspect of the invention, the end region of the center post in said one embodiment, and the end region of the center conductor in said second embodiment, is tapered to form a linear edge for providing the recited enhanced and substantially directional electric field, which field is coupled to the surface layer of the piezoelectric body and oriented along a single axis in the plane of said surface layer so as to predominantly excite a first shear mode of acoustical energy. By rotating the body with respect to the center post, or center conductor by about 90° a second shear mode can be predominantly excited. The precise degree of rotation is dependent upon the characteristics of the piezoelectric body employed.

In accordance with a second specific aspect of the invention, the end region of the center post, or center conductor, is shaped to form an eccentric apex for providing the enhanced and substantially directional electric field coupled to the surface layer of the piezoelectric body for exciting a first shear mode. By re-orienting the position of the body with respect to the apex so as to provide a substantially directional electric field in the surface layer of the body orthogonally related to that previously considered, a second shear mode is excited.

While the specification concludes with claims particularly pointing out and distinctly claiming the invention, it is believed that the invention will be better understood from the following description taken in connection with the accompanying drawings in which:

Figures 4, 5:
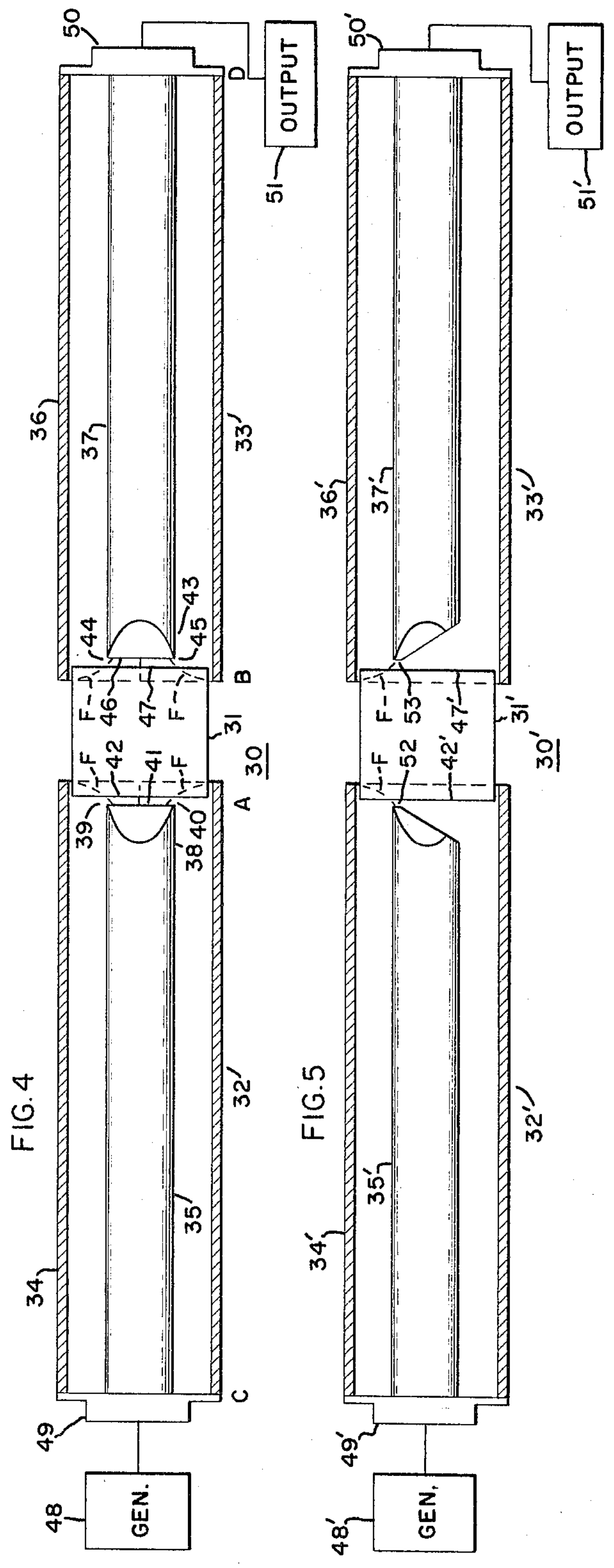

FIGURE 4 is a schematic illustration of a coaxial transmission line structure in accordance with a second embodiment of the invention in which high frequency phonon energy is excited in a piezoelectric body and wherein the center conductor is provided with a linear edge configuration; and FIGURE 5 is a schematic illustration of a coaxial transmission line, in accordance with the invention, wherein the center conductor is provided with an eccentric apex configuration.

Figure 1:
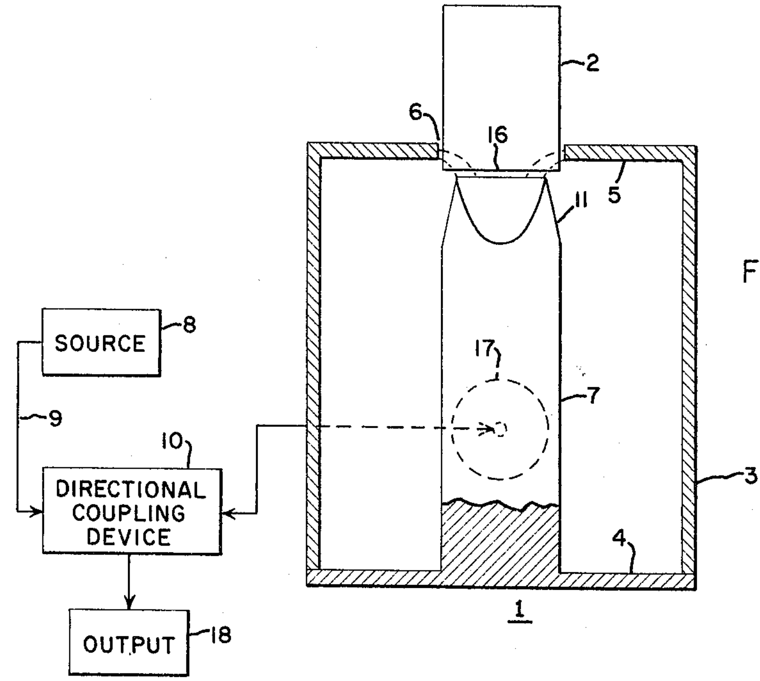
FIGURE 1 is a schematic illustration of a cavity structure in accordance with one embodiment of the invention in which high frequency phonon energy is excited in a piezoelectric body.

Referring to FIGURE 1, there is schematically illustrated a re-entrant cavity structure 1 which provides an enhanced electric field for exciting, with improved efficiency, phonon energy within a piezoelectric body 2. The electric field, further, has substantially directional characteristics for selectively exciting either of the shear modes of acoustical energy capable of excitation and propagation within the piezoelectric body 2. The re-entrant cavity structure 1 typically is provided with a cylindrically shaped outer side wall 3 and circularly shaped bottom and top end plates 4 and 5, top end plate 5 being provided with an aperture 6 to accommodate insertion of the piezoelectric body 2. It may be noted that the cavity 1 may assume other configurations commonly employed for re-entrant type cavity structures, such as rectangular or cubical constructions. The piezoelectric body 2 is typically a single crystal quartz member shaped in the form of a rod and preferably having optically flat end surfaces. It should be understood, however, that this body can be composed of other piezoelectric materials such as cadmium sulphide, gallium arsenide or zinc oxide. The shape of the body 2 can also be other than cylindrical, for example, rectangular. In accordance with well known practice, the piezoelectric transducer 2 can be bonded to a non-piezoelectric, phonon energy propagating medium. In such case, the transducer would normally be in the form of a thin disc.

The re-entrant cavity structure 1 is provided with a center post 7. A source of electromagnetic energy 8 is coupled by conventional transmission means, shown by line 9, through a directional coupling device 10 to a suitable connector 17 and introduced into the chamber of cavity structure 1. The device 10 is also connected to an output 18. In accordance with standard practice, the electromagnetic energy may be either capacitively, inductively or radiantly coupled into the cavity chamber. As is well known, in cavity structures of the type illustrated, the length of the center post is approximately equal to an integral odd number of quarter wavelengths of the electromagnetic energy, the bottom plate 4 being an electrical short circuit and the top portion of the cavity being approximately an electrical open circuit. Accordingly, the electric field of the electromagnetic energy introduced into the cavity extending between the center post 7 and the cavity walls is a minimum in the vicinity of the bottom end plate 4 and is a maximum in the vicinity of the top end plate 5, a considerable portion of the maximum field being coupled through the piezoelectric body 2.

Figure 2:
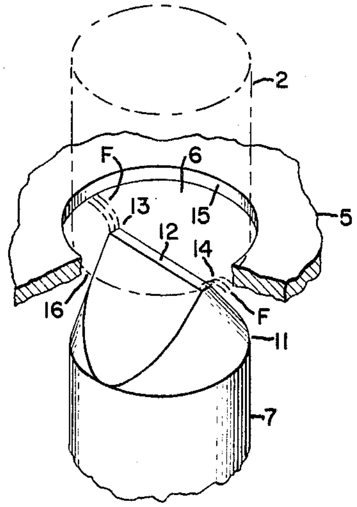
FIGURE 2 is a perspective view of a portion of the cavity structure of FIGURE 1 wherein the end region of the cavity center post is provided with one preferred configuration of a linear edge type.

In accordance with one aspect of the invention the end region 11 of the center post 7 is tapered to form a linear edge 12 of small finite width, the surface of which is disposed essentially in parallel with the opposing surface of the piezoelectric body 2, as illustrated in FIGURE 2. By shaping the end region 11 in the described manner, two dominant effects are provided: (1) there is an enhancement of the electric field coupled to the piezoelectric body 2, or more specifically, an increase in the density of the coupled electric field; and (2) the electric field is given a directional characteristic so that a large component of the field coupled to the body 2 has a substantially linear configuration.

A specific configuration of the end region 11 that has been employed is a chisel shape. As shown in FIGURE 2 an enhanced electric field is provided which is predominantly coupled between the ends 13 and 14 of the chisel edge 12 and the most proximate portions of the rim 15 of aperture 6, illustrated by the field lines F. The finite width of chisel edge 12 although small, is sufficient to support the enhanced electric field. The field configuration provided in the illustrated embodiment may be contrasted with the field configuraton provided by a conventional, unshaped cylindrical post having a circular cross-sectional end surface. In the latter case, the field extends uniformly from the periphery of the end surface to the rim of the cavity aperture and is completely symmetrical in the radial direction. By shaping the end region 11 in the manner shown in FIGURE 2, the field is now caused to be concentrated at the ends 13 and 14 of the chisel edge 12. Concentration of the electric field in this fashion produces a high density of the field penetrating within the piezoelectric body. Since in a piezoelectric body, the amount of electromagnetic energy that can be converted into acoustical energy is known to be proportioned to the square of the driving electric field, the accomplished enhancement of the field density coupled to the body 2 results in an enhanced phonon excitation.

In addition to the electric field enhancement noted above, a selective excitation of the shear modes capable of being propagated within the body 2 is readily accomplished. For selective excitation, the piezoelectric body 2 is inserted within the cavity chamber so that the relative position and spacing between the chisel edge 12, the rim 15 and the piezoelectric body 2 are such so as to cause a large component of the enhanced electric field to be coupled in the plane of the surface layer 16 of the piezoelectric body 2 and directed along substantially a single axis within said plane, which axis is parallel to the longitudinal axis of the chisel edge 12. Thus, the field may be said to be substantially directional in character. Since it is the electric field effective at the surface layer of a piezoelectric body that provides phonon excitation, it may be appreciated that the above described transverse field component in the plane of the surface layer 16 is capable of selectively exciting shear modes.

Accordingly, if the piezoelectric body 2 is an X cut quartz crystal, which is capable of propagating two distinct shear modes of acoustical energy that are excited therein in addition to a longitudinal mode, the body 2 is rotatably positioned with respect to the chisel edge 12 so that the transverse component of the substantially directional electric field at the surface layer 16 is in a direction for exciting predominantly one discrete mode of the two indicated shear modes. Since the two shear modes are orthogonally related, a 90° rotation of the X cut quartz crystal with respect to the chisel edge 12 will provide a predominant excitation of the second shear mode. It may be noted that if desired, both shear modes can be simultaneously excited by rotatably positioning the body 2 with respect to the chisel edge 12 intermediate the two indicated positions for discrete mode excitation.

Because there is present a longitudinal component of the substantially directional electric field, accompanying a selectively excited shear mode is also the longitudinal mode. By varying the penetration of the piezoelectric body 2 within the cavity chamber, thereby changing the spatial dimensions existing between the chisel edge 12, the body 2 and the rim 15, the extent to which the longitudinal mode is excited can be controlled. For example, by inserting the piezoelectric body 2 well into the chamber and touching or contiguous with the chisel edge 12, excitation of the longitudinal mode will predominate and there will be little shear mode excitation. Accordingly, it may be readily appreciated that shaping of the center post end region 11 in the prescribed manner provides considerable flexibility in selecting various modes of acoustical energy for excitation with a piezoelectric body, as well as providing enhancement of the electric field and therefore greater efficiency of excitation.

Although the above discussion is related specifically to an X cut quartz crystal piezoelectric body, this has been done primarily for illustrative purposes. It should be understood that the teaching of the present invention is equally applicable to numerous piezoelectric bodies of various materials as well as cuts.

In a given operation of the device illustrated in FIGURE 1, an RF pulse of electromagnetic energy from source 8 is coupled through directional coupling device 10 to the cavity 1. The electromagnetic energy is then coupled to a selected mode of acoustical energy within the piezoelectric body 2, in accordance with the above described principles. The excited phonon waves are propagated along the length of the body 2, being reflected, at the ends thereof and making repeated excursions through the body. Upon each excursion, a portion of the acoustical energy at the surface layer 16 is transduced into electromagnetic energy within the cavity chamber, said electromagnetic energy being coupled through the directional coupling device 10 to the output 18.

In the operating embodiment under consideration, an X cut quartz rod with a diameter of 6 mm. and a length of 2.5 cm. was employed. The source 8 included an S-band oscillator delivering microsecond pulses of 5 kw. peak power. Coupling was to the longitudinal mode and slow shear mode, the longitudinal mode having a velocity of propagation of $5.75\times10^5$ cm./sec. and the shear mode a velocity of $3.3\times10^5$ cm./sec. At liquid helium temperatures about 350 echoes of the shear mode and 180 echoes of the longitudinal mode were observed at the output 18. Only on the order of one-third this number of echoes were observed when using a conventional center post construction without the end region shaping taught by the present disclosure, all else being the same.

Figure 3:
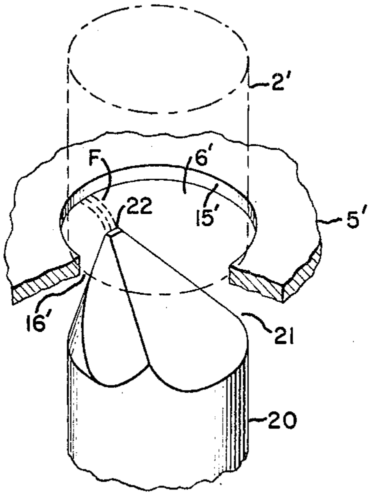
FIGURE 3 is a perspective view similar to FIGURE 2 wherein the end region of the cavity center post is provided with a second preferred configuration of an eccentric apex type.

In FIGURE 3 there is illustrated a further construction of the center post that may be employed in a re-entrant cavity structure of the type illustrated in FIGURE 1. Thus, the illustrated center post 20 has an end region

21 which is tapered to form an eccentric truncated apex 22 that is offset from the center of the aperture 6'. It is noted that the parts shown in FIGURE 3 which are similar to those in FIGURE 2 are identified by the same reference characters but with an added prime notation. A substantially directional electric field is provided between the eccentric truncated apex 22 and the most proximate portion of the rim 15' of aperture 6'. In effect, the field configuration is similar to that provided by a single end of the chisel edge 12 considered with respect to FIGURE 2, and excitation of the various modes of acoustical energy within piezoelectric body 2' are provided in a manner similar to that described with respect to FIGURES 1 and 2. Although the end region 21 is shown to be shaped by taking a diagonal cut through a chisel configuration across the broad edge of the chisel, the particular tapered shape employed is not particularly critical so long as a truncated apex is formed which is offset from a center position for providing the required substantially directional field. It should be understood that the offset should be sufficient so as to provide a predominant field in substantially a single direction.

It is noted that two such cavity structures as shown in FIGURE 1 can be employed together, one as an input cavity and the other as the output cavity, with the piezoelectric body extending between the two. For this construction the directional coupling device is not required.

With reference now to FIGURE 4, there is schematically illustrated a further embodiment of the invention, of a wide-band, coaxial transmission line structure 30 which provides an enhanced electric field of substantially directional characteristics for exciting phonon energy within a piezoelectric body 31. The transmission line structure 30 includes first and second transmission lines 32 and 33. Transmission line 32 has an outer cylindrical conductor 34 and a center cylindrical conductor 35, and is open-ended at A. Transmission line 33 has an outer cylindrical conductor 36 and a center cylindrical conductor 37, and is open-ended at B. Piezoelectric body 31, typically a quartz rod having a diameter about equal to the inside diameter of outer conductors 34 and 36, is inserted into and coupled between the open ends A and B. A source 48 of high frequency electromagnetic energy is coupled by conventional connector means 49 to input end C of transmission line 32. End D of line 33 is coupled by connector means 50 to an output 51.

Since end A is open, the electric field within the line 32 is maximum there. Comparable to the embodiments of FIGURES 1 to 3, the end region 38 of center conductor 35 is shaped to provide an enhanced, substantially directional electric field. In FIGURE 4, the end region 38 is chisel shaped. The electric field, shown by field lines F, extends from the ends 39 and 40 of the chisel edge 41 to proximate portions of the outer conductor 34, being coupled through the surface layer 42 of piezoelectric body 31, as described with respect to the previous embodiments.

Similarly, at open end B of transmission line 33, the electric field is maximum. The end region 43 of center conductor 37 is chisel shaped to provide an enhanced, substantially directional electric field extending from the ends 44 and 45 of chisel edge 46 to proximate portions of outer conductor 36, the electric field being coupled through surface layer 47 of piezoelectric body 31, shown by field lines F.

In a given operation of the device of FIGURE 4, high frequency electromagnetic energy, which may extend over a wide range of frequencies, e.g., 1K mc. to 2K mc., is coupled to end C of transmission line 32. The energy is propagated down the line and at end A is coupled to phonon energy within piezoelectric body 31. The phonon energy is propagated through the body 31 and converted back to electromagnetic energy at end B, traveling down the transmission line 33 and being coupled to the output 51. Adjustment of the position of body 31 with respect to chisel edges 41 and 46 provides a selective coupling to a desired mode or modes of the acoustical energy as explained with respect to the previous embodiments.

In addition to a chisel shape, the center conductor end regions can assume other configurations in accordance with the principles set forth herein. Thus, these end regions can be shaped to form eccentric truncated apexes 52 and 53, as shown in FIGURE 5. The electric field extends from truncated apexes 52 and 53 to proximate portions of outer conductors 34' and 36', respectively. The structure illustrated in FIGURE 5 is otherwise similar to corresponding structure of FIGURE 4, being identified by similar reference characters with an added prime notation, so that no further description is considered to be required.

It should be recognized that numerous modifications may be made to the specific embodiments of the invention herein described which do not exceed the basic teachings set forth. For example, the geometrical configurations of the center post and center conductor end regions that are shown are primarily exemplary and other construction may be readily employed which provide similar electric field enhancement. Further, high frequency transmission line constructions having at least a ground plane and a further conductor may be employed in the embodiments of FIGURES 4 and 5, in addition to the coaxial line illustrated.

The appended claims are intended to include all modifications falling within the true scope and spirit of the invention.

What we claim as new and desire to secure by Letters Patent of the United States is:

1. Apparatus for providing efficient coupling between RF electromagnetic energy and phonon energy by piezoelectric effects comprising:

(a) means for supporting said RF electromagnetic energy having a first conductor and a second conductor spaced therefrom, said electromagnetic energy exhibiting an RF electric field extending between said conductors, the first conductor having a free end region at one end of said means so as to provide an effective electrical open circuit at said one end with the electric field thereat a maximum, (b) said free end region being tapered to a reduced cross-sectional area tip disposed so as to establish between said tip and a portion of said second conductor an electric field of increased density, (c) a piezoelectric member for supporting said phonon energy, said member being interposed between said tip and the second conductor portion so that the increased density electric field is coupled through said member, whereby efficient coupling is provided between said RF electromagnetic energy and said phonon energy.

2. Apparatus as in claim 1 wherein said means for supporting said RF electromagnetic energy is a re-entrant type cavity structure, and said first and second conductors are the center post and the outer wall enclosure thereof, respectively.

3. Apparatus as in claim 1 wherein said means for supporting said RF electromagnetic energy is a transmission line structure.

4. Apparatus for providing efficient coupling between RF electromagnetic energy and specific modes of phonon energy by piezoelectric effects comprising:

(a) means for supporting said RF electromagnetic energy having a first conductor and a second conductor spaced therefrom, said electromagnetic energy exhibiting an RF electric field extending between said conductors, the first conductor having a free end region at one end of said means so as to provide an effective electrical open circuit at said one end with the electric field thereat a maximum, (b) said free end region being tapered to a relatively small cross-sectional area tip asymmetrically disposed with respect to said second conductor for establishing between said tip and a portion of said second conductor an electric field of increased density and directional characteristics, (c) a piezoelectric member for supporting said phonon energy, said member being interposed between said tip and the second conductor portion so that the increased density electric field is coupled through a transverse surface of said member with a substantial component of said increased density electric field oriented in a single direction within the plane of said transverse surface, whereby efficient coupling is provided between said electromagnetic energy and transverse modes of said phonon energy responsive to the singly directed electric field component.

5. Apparatus as in claim 4 wherein said member is rotatably positioned on its longitudinal axis with respect to the free end region tip so that relative rotation between said member and said tip provides a selective coupling between said electromagnetic energy and discrete transverse modes of said phonon energy, as well as combinations thereof.

6. Apparatus as in claim 5 wherein said free end region is tapered to a linear edge.

7. Apparatus as in claim 5 wherein said free end region is tapered to a truncated apex.

8. A high frequency, narrow band delay line comprising:

(a) a re-entrant cavity having a center post and a concentrically arranged outer wall enclosure, (b) directional coupling means coupling RF electromagnetic energy to and from said cavity structure, said electromagnetic energy exhibiting an RF electric field extending between said center post and said outer wall enclosure which field is a maximum in the vicinity of the free end region of said center post, (c) said outer wall enclosure being provided with a aperture opposite said free end region, (d) said free end region being tapered to a tip of small cross-sectional area asymmetrically disposed with respect to said aperture for establishing between said tip and the rim of said aperture an electric field of increased density and directional characteristics, (e) a piezolectric member for supporting said phonon energy, said member being inserted through said aperture and interposed between said tip and said aperture rim so that the increased density electric field is coupled through a transverse surface of said member with a substantial component oriented in a single direction within the plane of said transverse surface, whereby RF electromagnetic energy introduced into said cavity structure efficiently excites in said piezoelectric member transverse modes of said phonon energy that are responsive to the singly directed electric field component, the excited phonon energy upon propagating through said member being efficiently coupled back into RF electromagnetic energy that is extracted from said cavity structure with an appreciable time delay.

9. A delay line as in claim 8 wherein said free end region is tapered to a linear edge.

10. A delay line as in claim 8 wherein said free end region is tapered to a truncated apex.

11. A high frequency, wide-band delay line comprising:

(a) a transmission line structure including a first and second transmission line each having a first conductor and a second conductor spaced therefrom, (b) input means for coupling RF electromagnetic energy to one end of said first transmission line, (c) output means for coupling said RF electromagnetic energy from one end of said second transmission line, the RF electromagnetic energy propagating through said first and second transmission lines exhibiting an RF electric field extending between the first and second conductors thereof, (d) the other ends of each transmission line being open with the second conductor extending slightly beyond a free end region of the first conductor, said other ends appearing as an effective electrical open circuit with the electric field thereat a maximum, (e) the free end region of each of said first conductors being tapered to a tip of small cross-sectional area asymmetrically disposed with respect to the associated second conductor for establishing between said tip and a portion of the associated second conductor an electric field of increased density and of directional characteristics, (f) an elongated piezoelectric member for supporting said phonon energy, said member coupled between said first and second transmission lines, having its end faces inserted within the open ends of said first and second transimission lines, respectively, and interposed between the tip and the associated second conductor portion so that the increased density electric field within each transmission line is coupled through each end face with a substantial component of the increased density electric field oriented in a single direction within the plane of each end face, whereby RF electromagnetic energy introduced to said first transmission line efficiently excites in said piezoelectric member transverse modes of said phonon energy that are responsive to the singly directed electric field component, the excited phonon energy upon being propagated through said member being efficiently coupled back to RF electromagnetic energy that is extracted from said second transmission line with an appreciable time delay.

12. A delay line as in claim 11 wherein the free end regions are tapered to a linear edge.

13. A delay line as in claim 11 wherein the free end regions are tapered to a truncated apex.

14. A delay line as in claim 11 wherein said first and second transmission lines are of a coaxial construction and said first and second conductors are their center and outer conductors, respectively.

No references cited.

HERMAN KARL SAALBACH, *Primary Examiner.*

P. GENSLER, *Assistant Examiner.*